Patented Feb. 21, 1933

1,898,002

UNITED STATES PATENT OFFICE

WALTER G. CHRISTIANSEN, OF BLOOMFIELD, NEW JERSEY, AND ALFRED E. JURIST, OF BROOKLYN, NEW YORK, ASSIGNORS TO E. R. SQUIBB & SONS, OF NEW YORK, N. Y., A CORPORATION OF NEW YORK

ANTIPYRETIC COMPOSITIONS CONTAINING AMIDOPYRIN

No Drawing.   Application filed September 13, 1930.   Serial No. 481,799.

This invention relates to antipyretic compositions containing amidopyrin, and has for its object the provision of such compositions possessing greatly intensified therapeutic properties without aggravated toxicity.

We have found that the activity of amidopyrin may be enhanced by combining it, to form either a mechanical mixture of a chemical compound, with boric acid.

To make the mixture, we merely add the boric acid to the amidopyrin, preferably reducing to finely divided particles and intermingling thoroughly. Among the proportions that have been demonstrated to serve our purpose well are approximately four parts of boric acid to three of amidopyrin.

To make the compound, we cause amidopyrin and boric acid, preferably in the respective approximate proportions of one and five molecules, to interact in acetone, preferably heated, and expel the acetone from the reaction product by heating at a temperature above the boiling point of the acetone.

As an example of the preparation of the mixture, we may grind together in a mortar until powdered and thoroughly mixed, 231 g. of amidopyrin and 310 g. of boric acid.

As an example of the preparation of the compound, we may dissolve 33 g. of boric acid in 3 liters of boiling acetone, and add 25 g. of amidopyrin dissolved in 100 cc. of acetone. Then the mixture is evaporated to one-fifth of its original volume and allowed to cool. Crystals form, which may be collected on a Buechner's funnel and washed with acetone; and they are finally heated at about 60° C. The resulting white crystalline substance is amidopyrin borate, a compound of amidopyrin and boric acid in the respective approximate proportions of one and five molecules.

Compositions made by either of these specific processes—whether used in powdered or crystalline form, tableted in the customary manner, or administered in any other suitable way—are far more antipyretic, but no more toxic, than their amidopyrin content alone.

It is to be understood that the embodiments herein set forth are merely illustrative and by no means limitative of the invention, which may assume various other forms—for example as to the proportions of the components and the method of combining them—within the scope of the appended claims.

We claim:

1. An antipyretic composition consisting of amidopyrin and boric acid.

2. A composition consisting of amidopyrin and boric acid in mechanical mixture.

3. A composition consisting of a mechanical mixture of amidopyrin and boric acid in the approximate respective proportions of three and four.

4. A composition consisting of amidopyrin and boric acid in chemical combination.

5. Amidopyrin borate, composed of amidopyrin and boric acid in the respective approximate proportions of one and five molecules.

In witness whereof we affix our signatures.

WALTER G. CHRISTIANSEN.
ALFRED E. JURIST.